United States Patent
Di Giacomo et al.

[11] Patent Number: 6,159,121
[45] Date of Patent: Dec. 12, 2000

[54] TOOTHED BELT

[75] Inventors: Tommaso Di Giacomo, S. Martino S.M.; Marco Di Meco, Pescara; Camillo Ferrante; Franco Cipollone, both of Chieti, all of Italy

[73] Assignee: Dayco Europe S.r.l., Colonnella, Italy

[21] Appl. No.: 09/334,613

[22] Filed: Jun. 17, 1999

[30] Foreign Application Priority Data

Jun. 19, 1998 [IT] Italy ................................ TO98A0530

[51] Int. Cl.⁷ .................................................... F16G 1/28
[52] U.S. Cl. .......................... 474/205; 474/265; 474/250
[58] Field of Search .................................... 474/205, 204, 474/265, 250

[56] References Cited

U.S. PATENT DOCUMENTS

| | | | |
|---|---|---|---|
| 3,894,900 | 7/1975 | Redmond, Jr. ........................ | 156/138 |
| 4,011,766 | 3/1977 | Waugh ................................ | 474/205 X |
| 4,246,055 | 1/1981 | Henderson ............................ | 156/138 |
| 4,514,179 | 4/1985 | Skura .................................... | 474/204 |
| 4,604,081 | 8/1986 | Mashimo et al. ..................... | 474/205 |
| 4,632,665 | 12/1986 | Skura .................................... | 474/205 |
| 4,891,040 | 1/1990 | Nagai et al. ......................... | 474/267 |
| 5,120,280 | 6/1992 | Mizuno et al. . | |
| 5,317,886 | 6/1994 | Prahl ...................................... | 66/192 |
| 5,362,281 | 11/1994 | Dutton et al. ........................ | 474/205 |
| 5,378,206 | 1/1995 | Mizuno et al. ..................... | 474/205 X |
| 5,417,618 | 5/1995 | Osako et al. . | |
| 5,501,643 | 3/1996 | Ishiki et al. ........................... | 474/268 |
| 5,645,504 | 7/1997 | Westhoff .............................. | 474/250 |

FOREIGN PATENT DOCUMENTS

| | | |
|---|---|---|
| 259141 | 3/1988 | European Pat. Off. . |
| 0271587 | 6/1988 | European Pat. Off. . |
| 0637704 | 2/1995 | European Pat. Off. . |
| 965771 | 6/1999 | European Pat. Off. . |
| 59-23143 | 2/1984 | Japan . |

OTHER PUBLICATIONS

Patent Abstracts of Japan, vol. 017, No. 490, Sep. 6, 1993 & JP 05118390, published May 14, 1993.

Patent Abstracts of Japan, vol. 012, No. 222, Jun. 24, 1998 & JP 63019443, published Jan. 27, 1998.

Patent Abstracts of Japan, vol. 017, No. 172, Apr. 2, 1993 & JP 04331846, published Nov. 19, 1992.

*Primary Examiner*—Khoi Q. Ta
*Attorney, Agent, or Firm*—Stevens, Davis, Miller & Mosher, LLP

[57] ABSTRACT

Toothed belt in which the toothed part is covered with a fabric consisting of a warp and a weft consisting of weft threads formed by an elastic thread, preferably made from polyurethane, acting as the core, and by at least a pair of composite threads wound on the elastic thread. Each composite thread comprises a thread with high heat resistance and high strength, preferably made from para-aromatic polyamide, and a covering thread, preferably made from nylon, wound on the thread with high heat resistance and high strength. The structure of the weft of the toothed belt is such that each thread with high heat resistance and high strength can be completely isolated in such a way that it is not damaged by the friction of the belt against the teeth of the pulley, ensuring a greater durability of the belt. The structure with a pair of composite threads also makes it possible to increase the breaking load of the fabric.

11 Claims, 3 Drawing Sheets

TOOTHED BELT

The present invention relates to a fabric for a toothed transmission belt.

BACKGROUND OF THE INVENTION

There are known toothed transmission belts comprising a body made from elastomeric material having teeth on one of the surfaces and a fabric adhering to the surface of the teeth.

During the process of manufacturing the belt, the fabric is made to adhere to the teeth of the belt. Initially, therefore, the length of the fabric must be substantially equal to the circumference of the belt, whereas when the teeth are formed the fabric must have a length equal to the profile of the teeth of the toothed belt. It is therefore necessary for this fabric to be easily extensible in the longitudinal direction of the toothed belt.

For this reason there is a known method in which the threads of the fabric extending in the longitudinal direction of the belt are made from elastic material, for example the threads may consist of nylon as described in European Patent EP-271587.

In the following text, these threads of the fabric which extend in the longitudinal direction of the belt will be called the weft of the fabric, while the threads which extend in the transverse direction of the belt will be called the warp.

Recently, the use of toothed belts in engines for motor vehicles has required the reformulation of the composition of the threads of the fabric so that they can withstand higher temperatures and have increased strength. However, it is generally difficult to process fibres and obtain threads which have characteristics of high strength and heat resistance and which are also elastic. The use of composite fibres, or fibres composed of different materials, has therefore been proposed. Japanese patent application JP-63-15628 describes the use of a composite thread in which an aramid thread forms a spiral covering of an elastic polyurethane thread used in the weft of the fabric of a toothed belt. When the elastic polyurethane thread is not stretched, the spiral-wound aramid thread is slackened in such a way that the elastic thread can be elongated. The result is that the aramid covering thread can form loops around the elastic thread. When the covering thread forms the weft of the fabric of the toothed belt, the loops extend towards the exterior of the fabric, coming directly into contact with the teeth of the pulley. Thus the strength of the fabric is decreased and consequently the durability of the toothed belt is also decreased.

Moreover, in the composite thread described above the high-strength aramid thread is exposed on the outer surface of the fabric. It is thus substantially incorporated in the elastomeric material forming the belt. If the belt is subjected to repeated deformations, the aramid thread is also subjected to repeated bending and stretching which diminish its strength and reduce its durability.

EP-637704 describes a toothed belt comprising a fabric in which the longitudinal threads, which extend in the longitudinal direction of the toothed belt, are formed from covered threads, each of which is prepared by winding a thread with high strength and heat resistance on a core of elastic thread and then winding a further thread of synthetic fibre on the preceding ones.

From JP 05-118390, a method is also known for manufacturing a fabric for toothed belts consisting of a weft and a warp, in which the weft consists of an elastic thread covered with a composite thread formed by a covering thread which is wound round a thread with high heat resistance and high strength, and this structure will be defined in what follows as single-wound.

However, this solution does not provide sufficient assurance of strength and durability of the belt and does not completely prevent the formation of loops of the thread with high strength and heat resistance which may be formed in the interstices formed by the covering thread.

Moreover, it would be useful to be able to achieve a further increase in abrasion resistance, the adhesion between the fabric and the body of the belt and, in particular, in the breaking load which the fabric can withstand.

SUMMARY OF THE INVENTION

According to the present invention, a toothed belt is provided in which the toothed part is covered with a fabric consisting of a warp and a weft, characterized in that the weft consists of a weft thread formed by an elastic thread, acting as the core, and at least a pair of composite threads wound on the said elastic thread, each of the said composite threads comprising a thread with high heat resistance and high strength and at least one covering thread wound on the thread with high heat resistance and high strength.

BRIEF DESCRIPTION OF THE DRAWINGS

To enable the present invention to be understood more clearly, a preferred embodiment is described below, by way of example, without restriction and with reference to the attached drawings, in which.

DETAILED DESCRIPTION OF THE INVENTION

Figure 1:
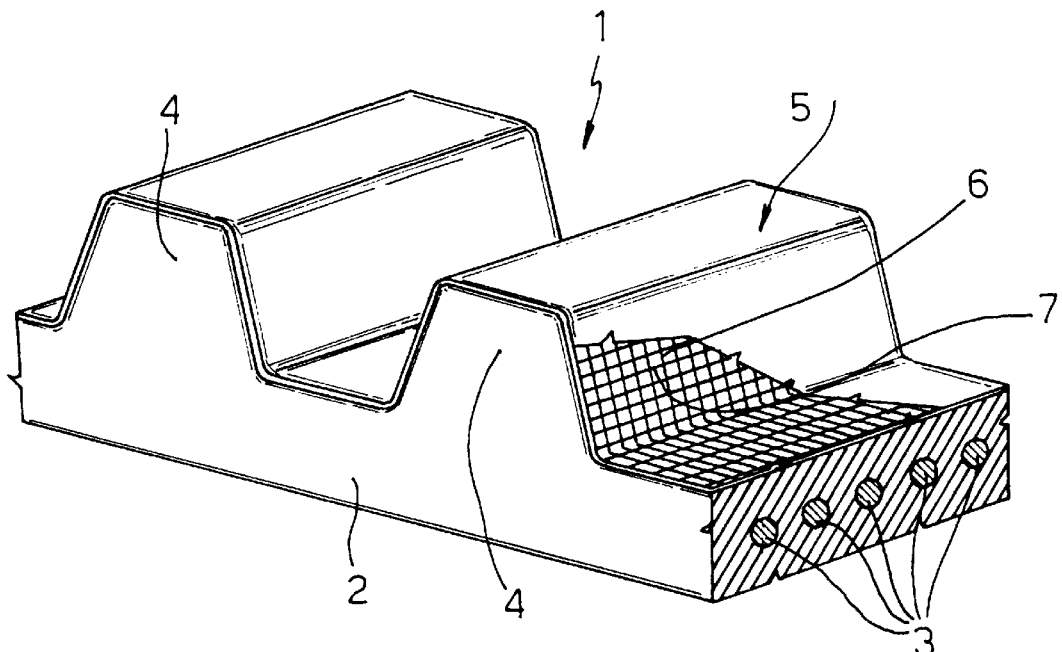
FIG. 1 is a partial perspective view of the toothed transmission belt made according to the invention.

With reference to FIG. 1, the number 1 indicates the whole of a toothed transmission belt.

The belt 1 comprises a body 2 of elastomeric material in which a plurality of strong longitudinal threadlike elements 3 is embedded.

The body 2 has teeth 4, which are covered with a fabric 5 having weft threads 6 extending in the longitudinal direction of the belt 1 and warp threads 7 extending in the transverse direction of the belt 1.

Figure 2:
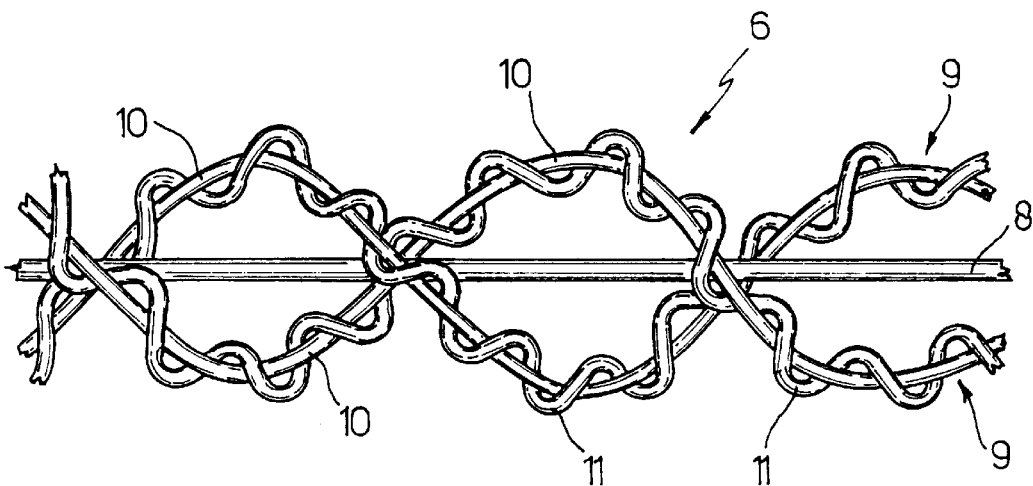
FIG. 2 shows schematically a composite thread forming the weft of the fabric covering the rubber body of the toothed belt shown in FIG. 1.

With reference to FIG. 2, the weft threads 6 consist of an elastic thread 8, acting as the core, and a pair of composite threads 9 wound on the elastic thread, each composite thread 9 comprising a thread with high heat resistance and high strength 10 and one covering thread 11 wound on the thread with high heat resistance and high strength.

Optionally, the weft thread may comprise an elastic thread acting as the core and a pair of composite threads 9, wound around the elastic thread 8 and each comprising a thread with high heat resistance and high strength 10 and a pair of covering threads 11 wound on the thread with high heat resistance and high strength 10. With this fabric structure the pair of composite threads 9 is wound around the elastic thread 8 in such a way as to cover its surface entirely.

The elastic thread 8 is preferably made from polyurethane.

The thread with high heat resistance and high strength 10 is preferably made from polyamide, and more preferably from para-aromatic polyamide, so as to ensure that the whole fabric 5 has high strength and heat resistance, and at the same time to isolate it from the outer surface.

The covering thread 11, which has greater resistance to abrasion, must have greater bulk than the thread with high heat resistance and high strength 10, in order to cover the latter entirely, and they are therefore preferably made from textured polymer material, more preferably from polyamide, and still more preferably from nylon 66 fibres; alternatively, the covering thread 11 has a hybrid composition, in that case preferably comprising nylon and Teflon. The covering thread 11 may be single or multiple; if there are two of these threads, one is wound in a clockwise direction and the other in an anticlockwise direction on the thread with high heat resistance and high strength 10.

Table 1 shows a preferred embodiment of the weft 6.

TABLE 1

| Composition of the weft thread | Unit of measurement | Value |
|---|---|---|
| ELASTIC CORE THREAD 8 | | |
| Type of material | | Polyurethane (Dorlastan ®- registered trade mark of Bayer) |
| Count of yarn | dtex (1 tex = 1 g/km of thread) | 480 |
| Number of threads | No. per 2.54 cm | 55 |
| HIGH-STRENGTH THREAD 10 | | |
| Type of material | | Para aromatic polyamide (Twaron ® 1008, registered trade mark of Akzo Nobel) |
| Count of yarn | dtex | 220 |
| Covering capacity | turns | 900 |
| COVERING THREAD 11 | | |
| Type of material | | Textured nylon 66 HT |
| Count of yarn | dtex | 110 |
| Covering capacity | turns/m | 1300 |

The warp 7 must have characteristics different from those of the weft 6 described above. This is because it does not have to be elastic, but must have high strength. Preferably, therefore, it is made from polyamide, and more preferably from meta-aromatic polyamide.

Table 2 shows a preferred embodiment of the warp 7.

TABLE 2

| Composition of the warp 7 | Unit of measurement | Value |
|---|---|---|
| Type of material | | Metaramide (Nomex - registered trade mark of Du Pont) |
| Count of yarn | dtex | 330 |
| Threads | No. per 2.54 cm | 80 |

The toothed belt according to the present invention can be made by means of the prior art, for example by forming the elastomeric body of the belt in a mould to which the fabric has previously been made to adhere.

To make the fabric adhere to the rubber part, an adhesive such as resorcinol, formaldehyde and latex (RFL) may be used.

The structure of the weft 6 with at least a pair of composite threads 9 wound on the elastic thread 8, also referred to as "double-wound" in what follows, and the structure of which is illustrated in table 1, allows the breaking load of the fabric 5 to be increased. In fact, with this structure the percentage of polyurethane in relation to the total weight of the fabric 5 is reduced and the polyurethane does not contribute to the breaking load of the fabric 5, its only function being to provide elasticity.

In the remainder of the description and in the tables, the following abbreviations are used:

PT=Final weight of the fabric

CR=Breaking load

FO=Number of threads in warp

TO=Count of yarn, warp

TF=Number of threads in weft

TNy=Count of yarn, nylon thread

TAr=Count of yarn, aramid thread

TPu=Count of yarn, polyurethane thread

AR=Elongation of the fabric at breakage

ARNy=Elongation at breakage, nylon thread

ARAr=Elongation at breakage, aramid thread

As an example of an embodiment, table 3 gives the values of the characteristics, the abbreviations of which have been given above, of the "double-wound" fabric 5; in particular, it may be noted that the corresponding breaking load for a fabric with a weight of 500 g/m$^2$ is 2035 N/2.5 cm.

TABLE 3

| "double-wound" fabric | | | | | | | | | | |
|---|---|---|---|---|---|---|---|---|---|---|
| CR N/2.5 cm | PT g/m2 | FO No/ 25 mm | TO dtex | TF No/ 25 mm | TNy dtex | TAr dtex | TPu dtex | AR [%] | ARNy [%] | ARAr [%] |
| 2035 | 505 | 55 | 235 | 85 | 155 | 220 | 465 | 145 | 22 | 4.5 |

For comparison, Table 4 gives the characteristics of a "single-wound" fabric.

TABLE 4

| "single-wound" fabric | | | | | | | | | | |
|---|---|---|---|---|---|---|---|---|---|---|
| CR N/2.5 cm | PT g/m2 | FO No/ 25 mm | TO dtex | TF No/ 25 mm | TNy dtex | TAr dtex | TPu dtex | AR [%] | ARNy [%] | ARAr [%] |
| 1720 | 520 | 65 | 235 | 85 | 155 | 220 | 465 | 145 | 22 | 4.5 |

For comparable fabrics, or those which have approximately the same weight, the value of the breaking load of the "double-wound" fabric 5 is greater than that of a "single-wound" fabric.

Figure 3:
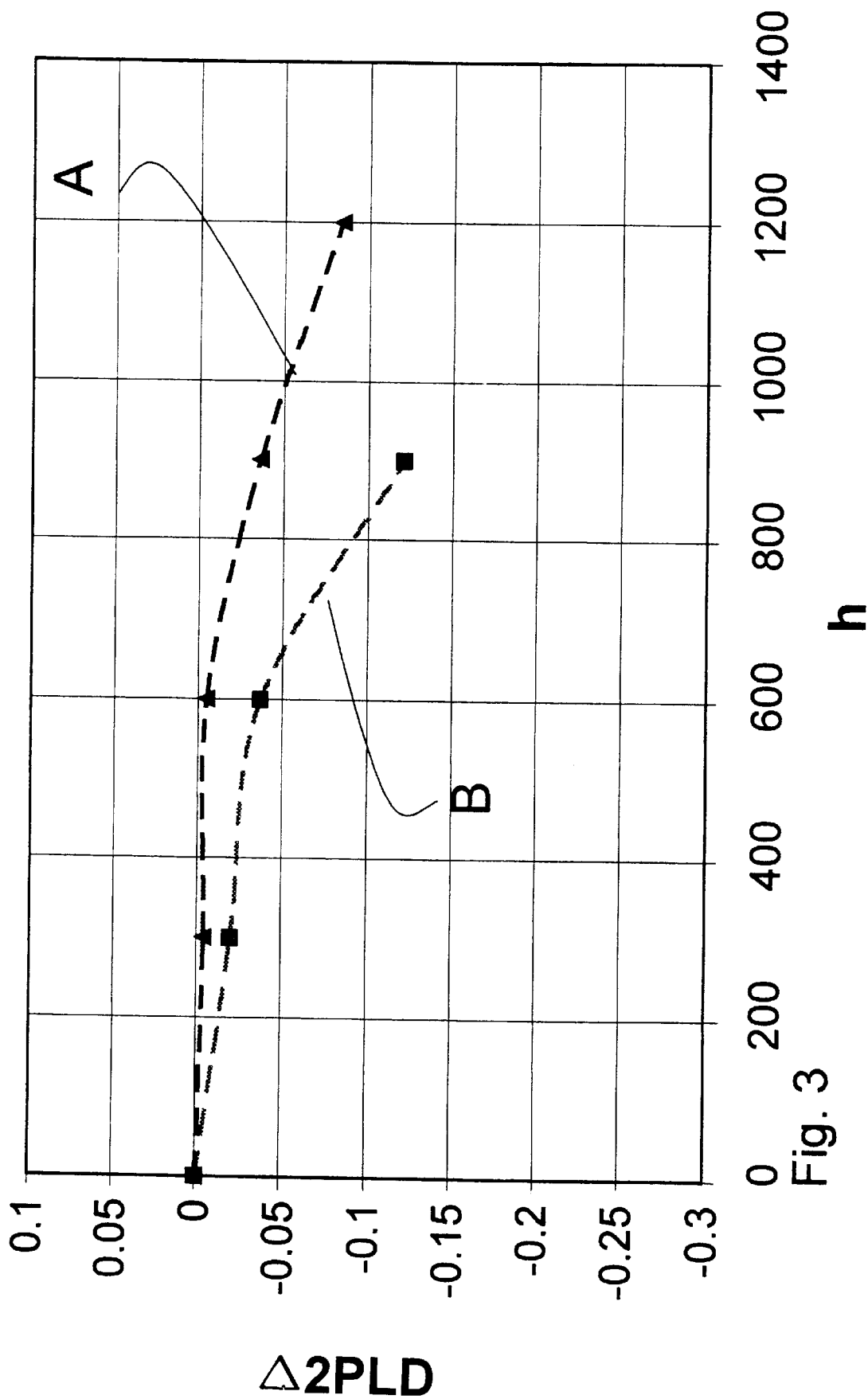
FIG. 3 shows the results of an initial wear test of a fabric according to the present invention and according to the prior art.
Figure 4:
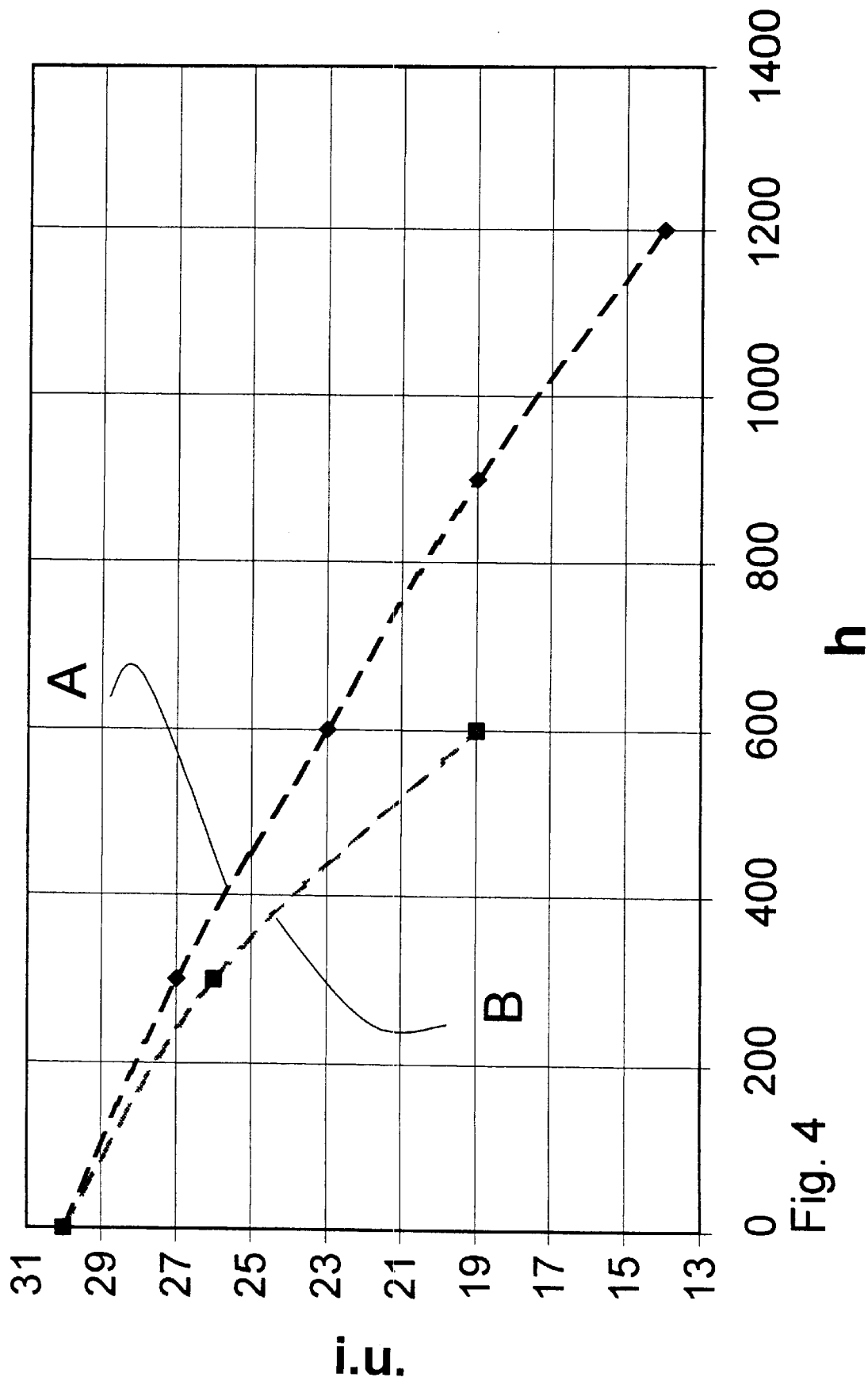
FIG. 4 shows the results of an initial wear test of a fabric according to the present invention and according to the prior art.

Tests were carried out on these fabrics, and the results are shown in the graphs given in FIGS. 3 and 4.

The tests carried out are of a substantially standard type, that is they are carried out substantially according to ISO standard 10917 of 1995, which describes how to carry out operating tests in which the belts tested transmit motion between a drive pulley and a driven pulley at a certain tension. Reference may be made to this standard for a detailed description of the test conditions. In the tests illustrated in FIGS. 3 and 4, there are some differences compared with the standard laid down, the pulleys having 20 and 40 teeth respectively instead of 19 and 38, and in addition the drive speed is 6000 rpm, the tension applied is 300 N, the temperature is 130° C. and the level of humidity is 60%.

In both tests, the belt indicated by A is "double-wound", while that indicated by B is "single-wound".

In detail, FIG. 3 shows a diagram representing the curve as a function of the measurement time expressed in hours of a quantity equal to double the variation in the PLD (Pitch Line Differential), which represents the measurement of the distance between the reinforcing element of the belt and the outer side of the fabric. A reduction in this distance is therefore a direct measure of the wear of the belt as a function of time.

In particular, the values of the variation in the PLD are measured every 300 hours, and as can be seen from an analysis of FIG. 3, breakage of the base of the tooth occurs after 900 hours on the single-wound belt while on the double-wound belt breakage of the base of the tooth occurs after 1200 hours. It may also be noted that in the measurements prior to breakage, too, the curve of the variation in PLD for the double-wound belt is always above the curve relating to the single-wound belt and therefore the first has less wear than the second.

FIG. 4 shows a diagram representing the curve as a function of measurement time expressed in hours of a wear index w.i. obtained by assigning a score from 1 to 6 to the five parts of the belt subject to wear: the driving side or the side of the tooth which bears against the drive pulley, the floor or area of the belt between two teeth, the driving root of the tooth or area between the driving side and the floor, the driven side or side of the tooth which bears against the pulley to which the motion is transmitted, and the driven root or root of the driven side.

In this diagram, the initial value of the wear index w.i. is therefore equal to 30 points and the belt undergoes visual inspection for w ear every 300 hours.

As will be observed, even at the first measurement the double-wound belt is found to have a wear index w.i. of 27 points as against the 26 of the single-wound belt, and this difference becomes accentuated in the next measurement, the single-wound belt breaking after 900 hours.

From an examination of the characteristics of the double-wound belt produced according to the present invention, the advantages which can be obtained with it are obvious.

In particular, the structure of the weft 6 of the toothed belt 1 according to the present invention enables each thread with high heat resistance and high strength 10 to be completely isolated both from the elastic thread 8 and from the rubber surface, because it is wound with a pair of composite threads 9. Moreover, the better covering provided by the "double-wound structure" according to the invention ensures that the thread with high heat resistance and high strength 10 does not form loops and that it is completely isolated from the outer surface in such a way that it is not damaged by the friction of the belt against the teeth of the pulley. In this way, a longer average belt life is ensured.

Finally, it is clear that modifications and variations of the toothed belt described and illustrated herein may be made without departure from the scope of protection of the present invention.

What is claimed is:

1. Toothed belt in which the toothed part is covered with a fabric (5) comprising a weft (6) and a warp (7), wherein said weft (6) comprises a weft thread formed by an elastic thread (8), acting as a core, and by at least a pair of composite threads (9) wound on said elastic thread (8), each composite thread (9) comprising a heat resistant thread (10) and at least one covering thread (11) wound on said heatresistant thread (10).

2. Toothed belt according to claim 1, wherein each of said composite threads (9) comprises said heat resistant thread (10) and a pair of said covering threads (11) wound on said heat resistant thread (10).

3. Toothed belt according to claim 1, wherein said first elastic thread (8) is made from polyurethane.

4. Toothed belt according to claim 1, wherein said heat resistant thread (10) is made from para-aromatic polyamide.

5. Toothed belt according to claim 3, wherein said covering thread (11) is a thread of textured polymer material.

6. Toothed belt according to claim 1, wherein said covering thread (11) is made from polyamide.

7. Toothed belt according to claim 1, wherein said covering thread (11) is made from nylon 66.

8. Toothed belt according to claim 1, wherein said warp (7) consists of threads of polyamide.

9. Toothed belt according to claim 1, wherein said warp (7) consists of threads of meta-aromatic polyamide.

10. Toothed belt according to claim 1, wherein said warp (7) comprises threads of polyamide.

11. Toothed belt according to claim 1, wherein said warp (7) comprises threads of meta-aromatic polyamide.

* * * * *